Sept. 7, 1937.  E. GAIRING  2,092,060
BORING AND MILLING TOOL
Filed June 17, 1936   3 Sheets-Sheet 1
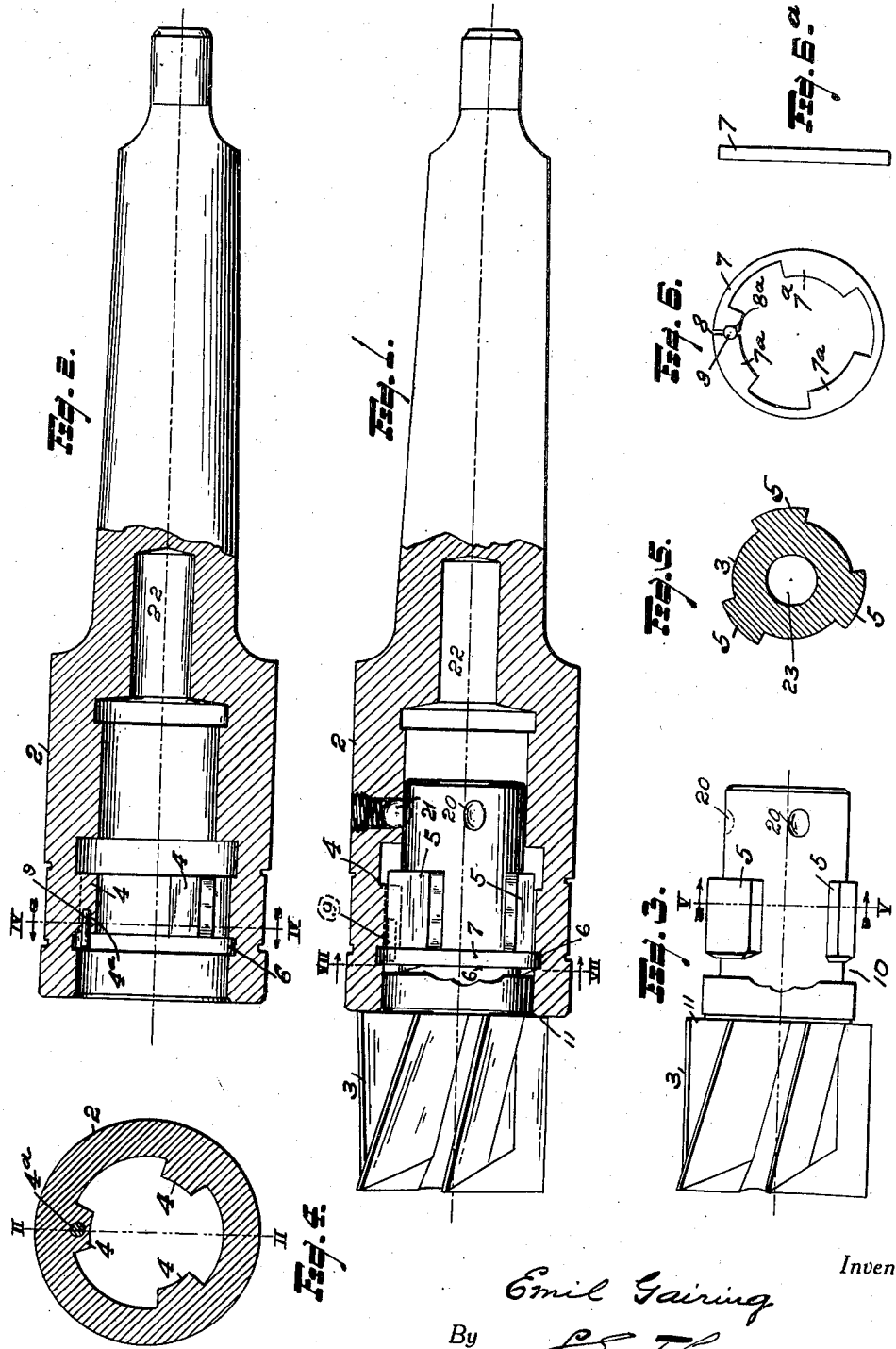
Inventor
Emil Gairing
By J. E. Thomas
Attorney Sept. 7, 1937.   E. GAIRING   2,092,060
BORING AND MILLING TOOL
Filed June 17, 1936   3 Sheets-Sheet 2
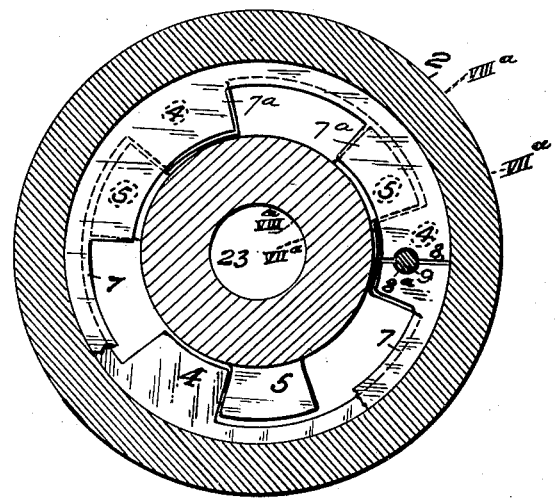
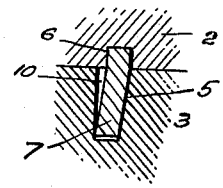
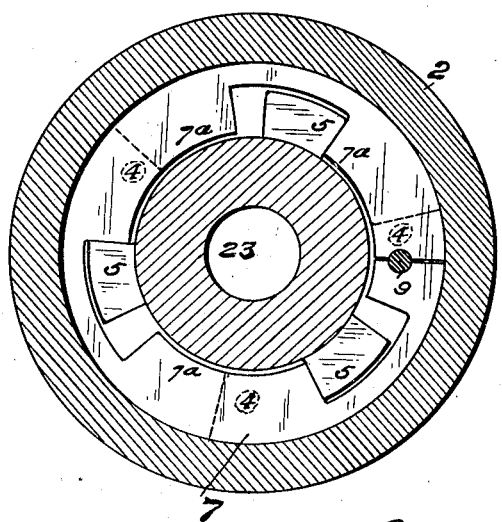
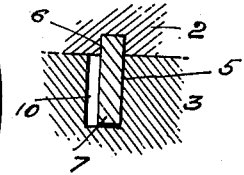
Emil Gairing   Inventor
By   S. E. Thomas   Attorney

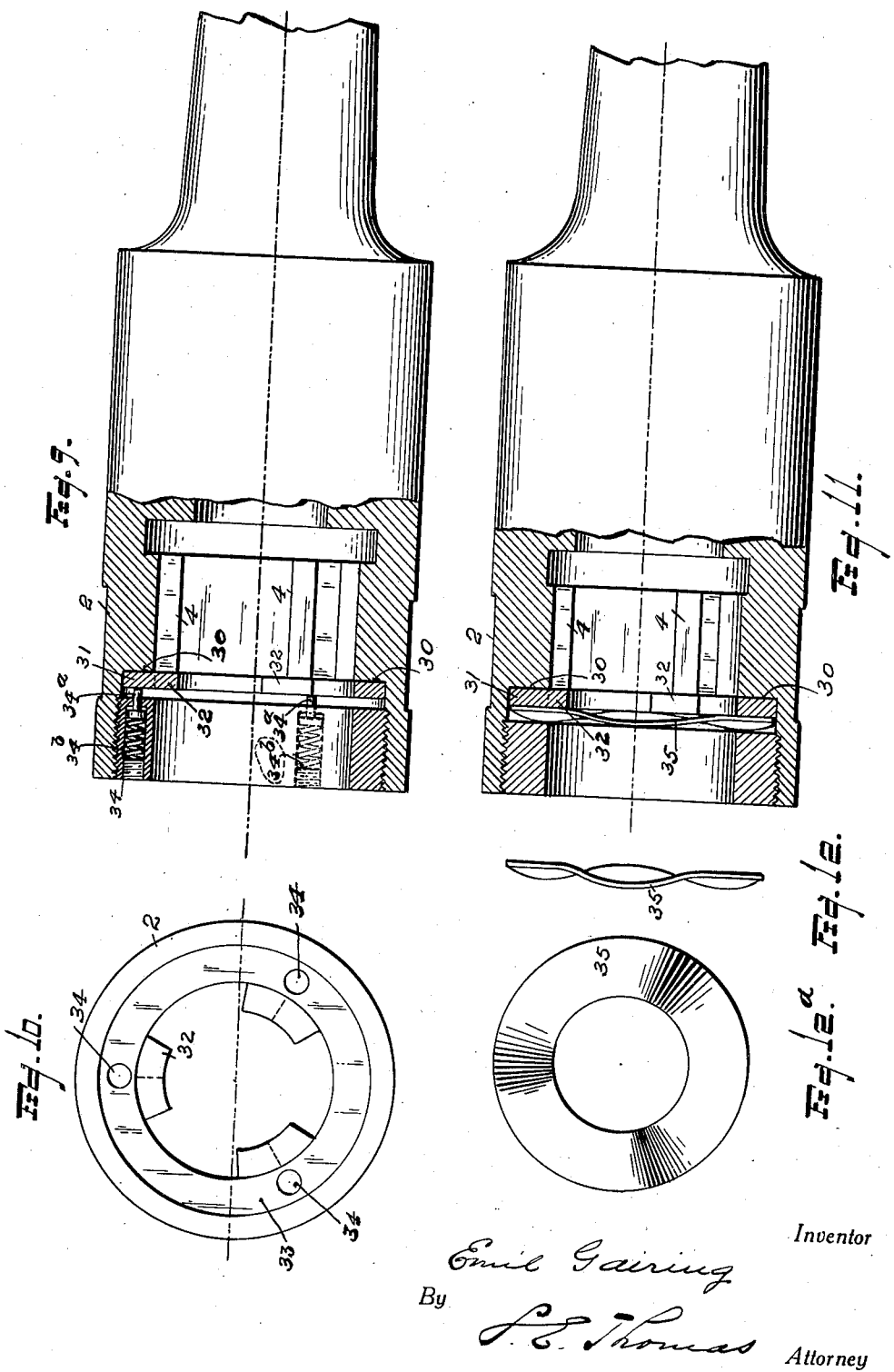

Patented Sept. 7, 1937

2,092,060

UNITED STATES PATENT OFFICE 2,092,060

BORING AND MILLING TOOL

Emil Gairing, Detroit, Mich., assignor to The Gairing Tool Company, a corporation of Michigan Application June 17, 1936, Serial No. 85,706

5 Claims. (Cl. 279—93)

My invention relates to boring and milling tools, and especially the fixing of the cutting tool in the tool holder.

The accompanying drawings show a tool holder and cutting tool embodying my invention in which:—

Figure 1 is an elevation of the assembled tool cut away where the tool holder and cutting tool interengage so as to present a longitudinal section.

Figure 2 is a view similar to Figure 1, showing the tool holder, separate from the cutting tool.

Figure 3 is a view similar to Figure 1, showing the cutting tool separate from the tool holder.

Figure 4 is a cross-sectional view of the tool holder taken on or about line IV—IV of Figure 2;—viewed in the direction indicated by the arrows.

Figure 5 is a cross-sectional view of the cutting tool taken on or about the line V—V, of Figure 3;—viewed in the direction indicated by the arrows.

Figure 6 is a face view of the clamping ring.

Figure 6ª is an edge view of the clamping ring shown in Figure 6.

Figure 7 is a sectional view on an enlarged scale, taken on or about line VII—VII, of Figure 1;—looking in the direction indicated by the arrows,—with one of the inwardly projecting portions of the retaining ring broken away to show the engagement of the lugs of the holder with the lugs of the cutter.

Figure 7ª is a detail sectional view taken on or about the line VIIª,—see Figure 7, showing one of the inwardly projecting portions of the clamping ring slightly bent through the relative rotation of the cutter and holder.

Figure 8 is a cross-sectional view taken on or about line VII—VII, of Figure 1;—showing the lugs or splines of the cutter as they are about to enter behind the spaced inwardly projecting portions of the clamping ring and prior to engaging the splines or lugs of the holder.

Figure 8ª is a detail cross-sectional view taken on or about line VIIIª, of Figure 7, showing the inwardly projecting portions of the clamping ring prior to being deflected by the relative rotation of the holder and cutter.

Figure 9 is a diametral section of the end of the holder showing a modified construction.

Figure 10 is an elevation looking from the left of Figure 9.

Figure 11 is a view similar to Figure 9, but showing a second modification.

Figure 12 is an edge view of the pressure ring shown in Figure 11.

Figure 12ª is a face view of the ring shown in Figure 12.

The numeral 2 indicates the tool holder, and 3 the cutting tool.

In the end of the holder 2, is formed a cylindrical coaxial cavity having three inwardly extending lugs 4, spaced at 120 degree intervals.

An end of the cutter is formed to fit into the cavity of the holder and is provided with three outwardly extending lugs 5, spaced at 120 degree intervals and adapted to pass between the spaced lugs 4, with circumferential freedom of movement,—and to engage the latter to prevent further relative rotative movement of the cutter and holder when said freedom of movement has been taken up.

The numeral 6 denotes a circumferential groove cut into the wall of the cavity of the holder 2, at the outer ends of the lugs 4 and in a plane at right angles to the center line of the tool.

The numeral 7 indicates a spring ring having three inwardly projecting portions 7ª, spaced at 120 degree intervals. Said ring is split at 8, and a hole 8ª is drilled so as to form a portion of the slot forming the split.

The ring 7 is sprung together so that it may be inserted in the cavity of the holder and expanded with its edge in the groove 6, as shown in the drawings. A pin 9 is then passed through the hole 8ª and into a cavity 4ª formed for it in the end of a lug 4. It is then peened so as to expand the ring and to hold its outer circumferential edge firmly in engagement in said groove to prevent its movement in relation to the splines or lugs 4, of the holder.

The numeral 10 indicates grooves cut at the ends of the lugs 5, furthest in the holder when assembled. The outer edges of the grooves 10 are slightly further apart than those of the grooves 6, and their inner walls are slanted or chamfered both radially and circumferentially to the same width as the groove 6 for the purpose hereinafter described.

The parts are adjusted and co-operate as follows:—

The cutter 3, is inserted into the holder, the shoulder 11 engaging against the end of the holder and the cylindrical portion and outer ends of the lugs 5, fitting against the wall of the cylindrical portion of the cavity. The lugs 5 pass through the openings between the inwardly extending portions 7ª, of the ring 7. The cutter and holder are then relatively rotated, the inwardly extending portions 7ª of the ring 7, entering the grooves at the inner ends of the lugs 5, and are slightly bent outwardly;—see Figures 3 and 7ª,— by the slanted and chamfered inner walls of said grooves. This movement is continued until the free relative movement of the lugs 4 and 5, is taken up,—see Figure 7,—through the engagement of the lugs 4 and 5 with each other;—whereupon the cutter is driven through the holder to do its work in the usual manner.

The construction shown provides a strong and positive unyielding working engagement, and a yielding engagement for coupling and uncoupling the holder and cutter, and furthermore is convenient to construct and assemble.

The cavities 20 in the cutter shank and the spring-pressed ball 21 in a cavity in the wall of the holder, co-ordinate to fix the circumferential relation of the cutter and holder when engaged.

The coaxial cavities 22 in the holder and 23 in the cutter serve to accommodate a pilot-bar;—not shown.

In the modifications shown in Figures 9 and 11, the open end of the holder 2, is enlarged so as to remove the outer wall of the groove 6, the opening being screw-threaded. The numeral 30, indicates an annular shoulder corresponding to the inner wall of the groove 6. The numeral 31, indicates a ring or washer, fitting into the open end of the cavity of the holder, against the shoulder 30, and is provided with inwardly projecting portions 32, corresponding to the parts 7a of the ring 7.

The numeral 33, indicates a ring provided with screw-threads on its circumference adapted to engage the screw-threads of the cavity of the holder, its inner edge forming a wall corresponding to the outer wall of the groove 6, and so located that there may be a little room for the axial movement of the ring 31. The numeral 34 denotes cavities bored into the outer edge of the ring 33, 120 degrees apart, with their axes parallel to the axis of the holder. The numeral 34a, indicates a pin passing axially through the inner end of each of the cavities, each of their inner ends bearing against the ring or washer 31. The numeral 34b, denotes a coil spring in each of the cavities 34, pressing the pins 34a against the ring 31. The outer end of each of the cavities 34, is closed by a screw-threaded plug which also serves to compress the spring 34b.

In the modification shown in Figures 11, 12, and 12a an approximately flat pressure spring 35, is substituted for the coil springs and pins of the form of Figures 9 and 10, by being inserted between the washer 31 and inner edge of the ring 33. The spring 35 is slightly fluted as shown in Figure 12, and indicated in Figure 11, so that it shall be held in compression by the ring 33 and shall exert a resilient pressure upon the washer 31.

In both of the modifications of Figures 9–12a, the inwardly extending portions of the ring 31, are engaged by the slanting outer edges of the lugs extending from the cutter and forced outward against the spring pressure on said ring thus yieldingly securing the cutter in the holder.

The contacting driving edges of the lugs 4 and 5 are radial, thus avoiding the tendency to upset and deform the same at their edges.

Having thus described my invention, what I claim is:—

1. In an apparatus of the kind described, the combination of a holder having a cylindrical cavity therein and a plurality of lugs extending inwardly from the wall thereof; a ring fixed to the wall of the holder and coaxial therewith; a cutter fitting and adapted to turn in said cavity and having an outwardly extending lug adapted to engage the lugs on the holder to prevent relative turning of said cutter and holder, but adapted to permit said turning within limits, said ring having an opening therethrough adapted to permit the passage of the lug on the cutter, the outer end of the lug on the cutter being adapted to engage said ring to bind the cutter to the holder against longitudinal and circumferential movement prior to its application to the work.

2. In an apparatus of the kind described, the combination of a holder having a cylindrical cavity therein and an integral lug extending inwardly from the wall of the said cavity; a cutter adapted to fit and turn in said cavity and having an outwardly extending lug adapted to engage said lug on said holder to prevent relative rotary movement of said cutter and holder, but adapted to permit said turning within limits, said holder being provided with a coaxial groove around the wall of the cavity; a split ring adapted to expand to engage its marginal edge in said groove, and being cut away to permit the passage of the lug on said cutter, an end of the lug on the cutter being inclined circumferentially and adapted to engage said ring during relative circumferential movement to force said holder and cutter into close engagement when said lugs are engaged.

3. In an apparatus of the kind described, the combination of a holder having a cylindrical cavity therein; a tool adapted to fit and turn in the cavity of the holder; a lug extending inwardly integral with the wall of the cylindrical cavity of the holder; a lug extending outwardly from the tool and integral therewith, the lugs of the tool and holder being adapted to engage each other to prevent circumferential movement following a limited rotative movement of the tool when inserted in the holder; the lower end of said tool lug having an inclined surface extending toward the end of the holder; and a resilient part of the holder, adapted to engage the inclined surface of the tool lug, whereby the tool is forced against the end of the holder.

4. In an apparatus of the kind described, the combination of a holder having a cylindrical cavity therein; a tool having a shank and projecting lugs adapted to fit and turn in said cavity; lugs integral with the wall of the holder, extending into the cavity; the respective lugs of the tool shank and of the tool holder being adapted to engage each other to prevent circumferential movement, following a limited relative rotative movement of tool when inserted in the holder; an inclined surface on the lower end of the lugs extending outwardly from the shank of the tool, adapted on a limited rotative movement of the tool in relation to the holder to engage a resilient part carried by the holder; a resilient part on the holder, adapted to be engaged by the inclined surface of the tool lugs, whereby said tool may be forced against the end of the holder and rigidly held against longitudinal and circumferential movement in the holder when applied to the work.

5. In an apparatus of the kind described, a holder having a cylindrical cavity, the wall of the cavity having a circular coaxial groove therein; a split ring adapted to enter the cavity when contracted and to expand to engage the outer marginal wall of the coaxial groove when inserted therein; said ring having inwardly extending lugs dished upwardly; a tool adapted to fit and turn in the cylindrical cavity of the holder, and to engage the lugs of the ring, whereby when rotated said tool may be forced into abutting contact with the end of the holder.

EMIL GAIRING.